United States Patent [19]

Comfort

[11] 3,712,492
[45] Jan. 23, 1973

[54] SIDELOADER WITH POWERED ROLLERS FOR ENDWISE UNLOADING

[75] Inventor: Samuel T. Comfort, Homewood, Ill.

[73] Assignee: Allis-Chalmers Corporation, Milwaukee, Wis.

[22] Filed: July 1, 1971

[21] Appl. No.: 158,855

[52] U.S. Cl. ....................214/518, 214/75 G, 214/84
[51] Int. Cl. .............................................B60p 1/52
[58] Field of Search......214/670, 671, 672, 673, 674, 214/75 G, 84, 518, 512

[56] References Cited

FOREIGN PATENTS OR APPLICATIONS 2,008,372  1/1970  France................214/75 G

OTHER PUBLICATIONS

Materials Handling, June 1968, page 961.

Primary Examiner—Albert J. Makay
Attorney—Charles L. Schwab et al.

[57] ABSTRACT

A sideloader lift truck is provided with powered rollers on fore and aft decks which are either elevatable or constructed to be at the same height as the load floor of an aircraft. The sideloader truck is especially useful in loading cargo into end loaded cargo aircraft.

3 Claims, 3 Drawing Figures

SIDELOADER WITH POWERED ROLLERS FOR ENDWISE UNLOADING

BACKGROUND OF THE INVENTION

Heretofore the containerization industry has made considerable strides in improving movement of cargo by train, truck, and ship. Presently, considerable attention is being given to use of large jet type aircraft to transport large containers of goods. While vehicles and other cargo handling equipment have been suggested and provided for handling large containers transported by ships, trains, and trucks, such equipment has not been found completely satisfactory for use in loading and unloading aircraft. At this time, several different material handling vehicles sequentially handle large cargo containers as they are loaded into and removed from cargo type aircraft. Providing several pieces of materials handling equipment and multiple handling are expensive.

SUMMARY OF THE INVENTION

In the present invention a sideloader lift truck is provided with special fore and aft decks which may either be of fixed elevation, at the floor height of a particular aircraft or adjustable to place the decks at the same height as the loading floor of various aircraft. These special decks are provided with powered rollers which are capable of moving a cargo container longitudinally on and off the sideloader truck. The cargo containers handled by this specially constructed sideloader truck are approximately the longitudinal length of the truck, so as to rest on the fore and aft decks and are normally lifted onto the truck from storage by its top lift attachment.

DETAILED DESCRIPTION OF THE INVENTION

Figure 1:
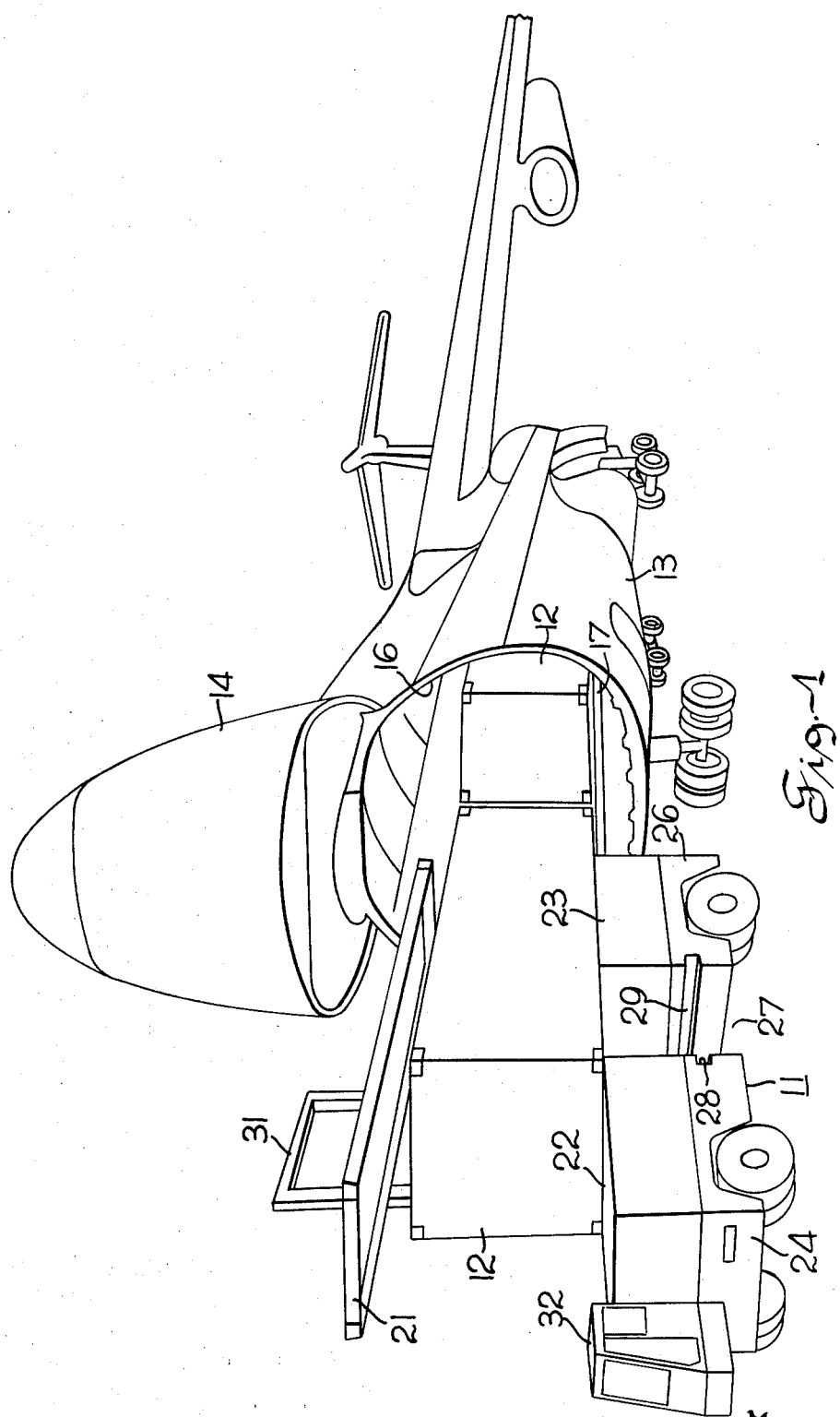
FIG. 1 is a pictorial view of a sideloader lift truck of the present invention and a cargo aircraft engaged in a cargo transfer operation.

Referring to FIG. 1, a sideloader lift truck 11 is shown transferring a cargo container 12 into a jet type cargo aircraft 13 such as the Model C-5A built by Lockheed Aircraft Corporation of Burbank, California. On this type of aircraft the front end portion 14 hinges upwardly to expose a substantially full width opening 16. The cargo deck 17 of the aircraft is provided with commercially available powered rollers, not shown, for moving cargo containers to the rear of the aircraft. As depicted in FIG. 1, a cargo container 12 is being transferred from the sideloader truck 11 onto the floor 17 of aircraft 13. It will be noted that the top lift attachment 21 which was used to place the cargo container 12 onto the sideloader has been released from the cargo container 12. The sideloader is provided with boxlike decks 22, 23 which are releasably secured to front and rear sections 24, 26 of the sideloader by suitable means, not shown. The sideloader truck has the usual well 27 between the front section 24 and rear section 26 with guide ways 28, 29 in which a mast assembly 31 laterally reciprocates. A conventional operator's cab 32 is provided for the sideloader truck 11. As illustrated in FIG. 1, the special decks 22, 23 are of a fixed height and are add-on sections to a conventional sideloader truck.

Figure 2:
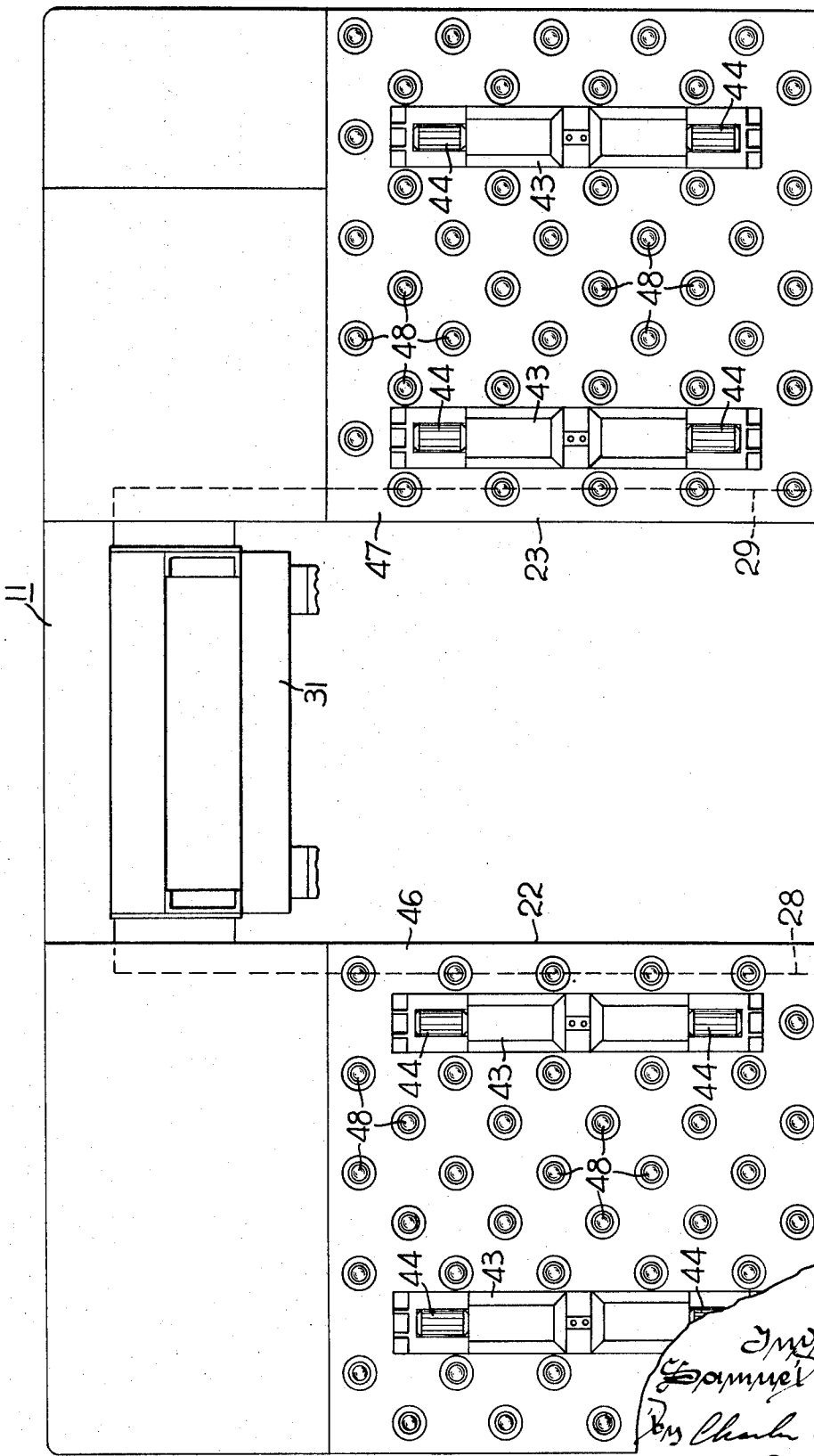
FIG. 2 is a top view of the sideloader shown in FIG. 1.

Referring to FIG. 2, which is a top view of the sideloader truck shown in FIG. 1, the special decks 22, 23 are provided with powered roller assemblies 43, which include a cargo drive roller 44. As illustrated, four of these roller assemblies 43 are built into the top floor 46, 47 of the special decks 22, 23. Also universal direction, ball rollers 48 are provided in the decks to facilitate cargo movement. The powered roller assemblies 43 are commercially available. One such roller assembly being Model 20627 Varoller actuator manufactured by Varo, Inc., Santa Barbara, California.

Figure 3:
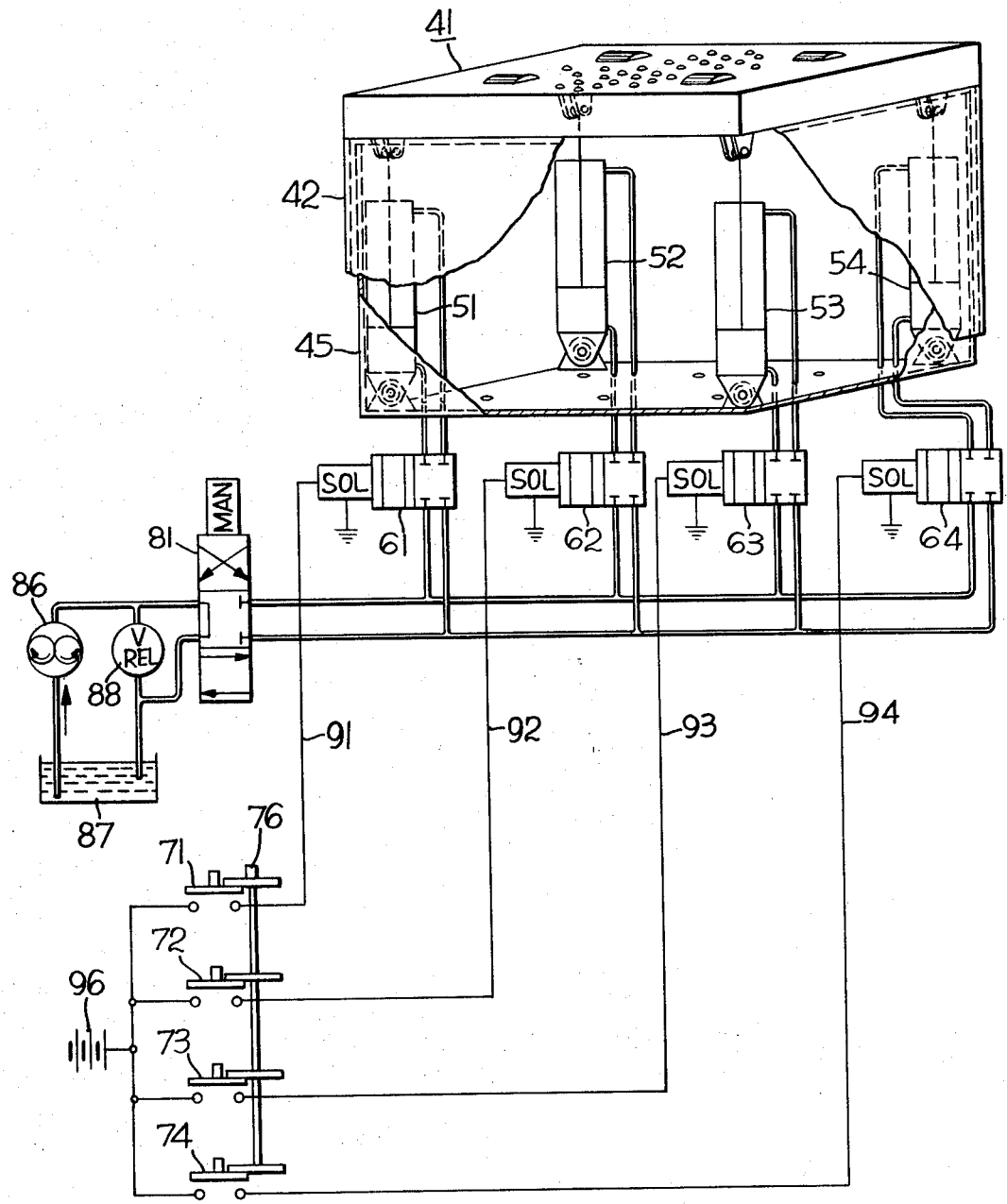
FIG. 3 is a schematic view showing an elevatable lift truck deck and hydraulic control system therefor.

Referring to FIG. 3, an elevatable deck assembly 41 is illustrated which can be attached to the fore or aft section 24, 26 of truck 11 in place of the fixed height deck 22 or 23. The deck assembly is made up of telescoped upper and lower box parts 42, 45. Four jacks 51, 52, 53, 54 have their rod ends pivotally connected to the upper box part 42 and their cylinder ends pivotally connected to lower box part 45. The jacks may be simultaneously actuated by first closing solenoid valves 61, 62, 63, 64 by moving switches 71, 72, 73, 74 downwardly to bridge their associated contacts. This may be achieved by moving a single manually operated switch operating member 76 downwardly. With the switches 71, 72, 73, 74 closed, the solenoid valves will move from their illustrated closed position to an open position in which fluid may pass to and from the jacks upon operation of manual control valve 81. If manual control valve 81 is moved upwardly, the rams 51, 52, 53, 54 will be extended to move the part 41 upwardly. If it is desired to move less than all four rams to adjust the deck to a desired inclination, this can be accomplished by selectively operating switches 71, 72, 73, 74 together with valve 81.

The top part 42 includes powered roller assemblies and universal rollers in its top or deck portion which are of the same construction as the roller assemblies 43 and rollers 48 shown in FIG. 2. The lower part 45 is adapted to be releasably secured to the front or rear section 24, 26 of the truck by suitable fastening means, not shown. The hydraulic control system includes a pump 86, reservoir 87 and relief valve 88. The electric circuits 91, 92, 93, 94 are connected in parallel to a suitable source of electrical energy, such as a battery 96.

OPERATION

When it is desired to load cargo containers into a cargo type aircraft, the sideloader truck with top lift attachment picks up the cargo container from its place of repose, such as storage area, truck or train and transports the cargo container to the aircraft. The sideloader truck is backed up to the aircraft having its end opened for cargo loading. If a fixed height deck is used on the sideloader truck, its height will have been predetermined to be that of the height of the aircraft it loads. If the sideloader has elevatable decks, such decks will be adjusted to be on the same plane as the loading floor of the aircraft. The top lift attachment is released and raised out of the way and the rollers 44 are then powered in a direction to move the cargo container into the aircraft. As the container enters the aircraft powered rollers in the floor of the aircraft will assist in the transfer and then move the container to the desired location within the aircraft. The powered rollers in the aircraft floor and the lift truck decks are reversible whereby unloading the aircraft is effected by reversing the loading procedure.

As is apparent from the foregoing description, the addition of special decks with powered rollers makes possible the transfer of cargo containers with a single piece of mobile materials handling equipment, thereby eliminating multiple handling by multiple mobile equipment as has heretofore been employed. As can be appreciated, this improved materials handling means is more efficient, less costly, and is less likely to damage cargo.

The embodiments of the invention in which an exclusive property or privilege is claimed are defined as follows:

1. In a sideloader lift truck of the type having fore and aft platform sections and a well therebetween opening at one side thereof and a mast with top lift attachment mounted on said sideloader truck for lateral reciprocable movement in said well, the improvement comprising:
   a deck secured to each of said sections
   powered roller means on said decks for moving cargo containers resting thereon longitudinally of said truck and
   power operated adjusting means interposed between said decks and said sections, respectively, selectively operable to adjust the elevation of said decks relative to said sections.

2. The invention of claim 1 wherein said power operated adjusting means are operable to adjust the inclination of said decks.

3. The invention of claim 2, wherein said power operated adjusting means include a plurality of hydraulic jacks operable to adjust the height and inclination of said decks.

* * * * *